United States Patent Office 3,849,488
Patented Nov. 19, 1974

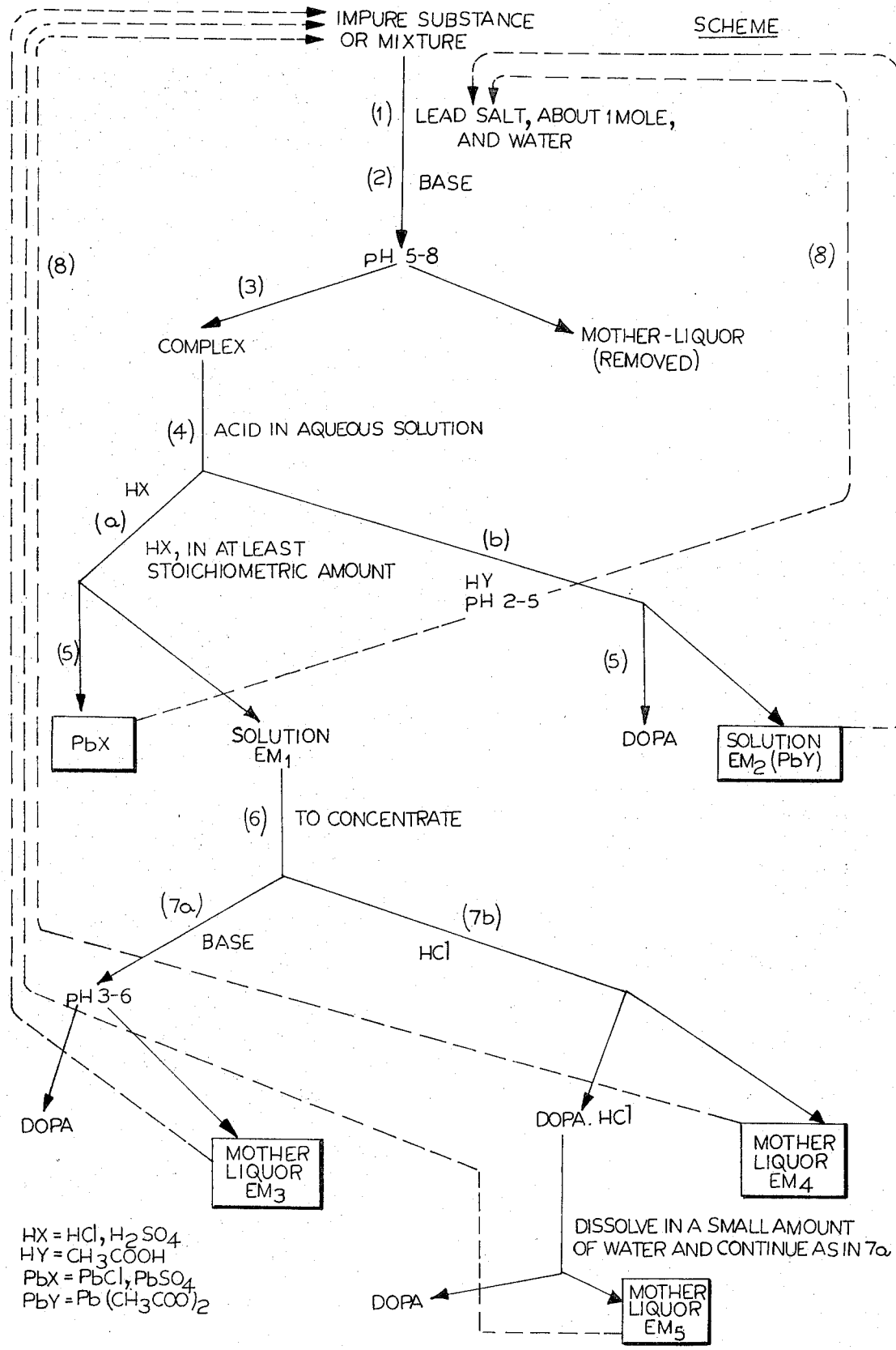

3,849,488
ISOLATION AND PURIFICATION OF 3,4-DIHYDROXY PHENYLALANINE
Max Brenner, Spiegelbergstrasse 33, Basel, Switzerland
Filed Aug. 27, 1971, Ser. No. 175,520
Claims priority, application Switzerland, Aug. 27, 1970, 12,866/70
Int. Cl. C07c 101/72
U.S. Cl. 260—519
29 Claims

ABSTRACT OF THE DISCLOSURE

A process for preparing pure, 3,4-dihydroxy phenylalanine from an impure substance or from a mixture containing the said substance, characterized in that (1) the starting material is treated with an approximately equimolecular quantity of a lead salt in the presence of water, either a lead salt insoluble or slightly soluble in water, or a lead salt soluble in water, (2) the pH of the reactive mixture is brought to and maintained between 5 and 8 by means of a base, (3) the mother liquor is separated and the complex of 3,4-dihydroxy phenylalanine and lead, which is precipitated, is washed, the mother liquor and the washing waters being eliminated, (4) the complex is decomposed by an acid in aqueous solution which is either (a) a concentrated solution of an acid forming a lead salt which is insoluble or slightly soluble in water, employed in at least stoichiometric quantity in relation to the sum of 3,4-dihydroxy phenylalanine and lead, or (b) a diluted solution of an acid forming a salt soluble in water, employed in such a quantity and such a concentration that the resulting pH is comprised between 2 and 5, (5) the substance which precipitates and crystallizes is separated and washed and it consists either (a) of a lead salt which is insoluble or slightly soluble while the solution and the washing waters are combined and contain pure 3,4-dihydroxy phenylalanine in the form of its cation, or (b) it consists of pure 3,4-dihydroxy phenylalanine while the solution and the washing waters contain a lead salt, (6) from the step 5(a) combined solution, pure 3,4-dihydroxy phenylalanine is isolated first by a concentration to a low volume, then (7a) the pH is adjusted to a value between 3 and 6 by means of a base, which precipitates and crystallizes the substance that is separated from the mother liquor and washed, the mother liquor and the washing waters being then combined, or (7b) by a treatment with hydrochloric gas, by separating from the mother liquor the chlorhydrate which has crystallized and which is washed, the mother liquor and the washing waters being then combined, by dissolving the chlorhydrate in a small amount of water and by continuing the treatment as described under 7a, there is obtained the substance and a mother liquor and a washing water, and (8) all the residues collected during the preceding operations are recycled, i.e., the insoluble or slightly soluble lead salt obtained in 5a or the lead salt solution obtained in 5b is reemployed in a new stage (1), as a reagent source, and the mother liquors and washing waters obtained in 7a or 7b, still containing 3,4-dihydroxy phenylalanine or its chlorhydrate are reemployed in a new stage (1) as an additional source of the starting material.

Recently, 3,4-dihydroxy-L-phenylalanine or LDOPA, known for a long time, has been employed successfully in the treatment of the Parkinson's disease. The L-DOPA eliminates the disorders caused by this disease, when administered in relatively high doses, i.e., 5–10 g. per day [G. C. Cotzias, F. S. Papavasileu, R. Gellene, The New England Journal of Medicine 280, 337–345 (1969)]. Quite recently, its employment for such a purpose was authorized in the United States of America (Drug Trade News 1970, June 15, pages 1 and 18).

The substance may be obtained through isolation from a natural material, through a partial synthesis or through a total synthesis. Each of these methods leads to a costly product.

Its physical properties are such that the purification through recrystallization is only possible with high losses [E. Wasser & M. Lewandovski, Helv. Chim. Acta 4, 657–666 (1921)].

It has also been proposed to recover the L-DOPA contained in mother-liquor but, owing to the high sensitivity of the L-DOPA in relation to the air oxygen [R. R. Sealock, Biochem. Prep. 1, 27 (1949)], colored substance unacceptable in pharmaceutical preparations is thus obtained, even in the presence of a reducing agent such as $SO_2$.

In view of the actual limitations of the L-DOPA production in the world and the high number of persons afflicted with Parkinson's disease (e.g., see Drug Trade News 1970, June 15, p. 18), it is certainly indispensable that no source of the L-DOPA be overlooked and, in particular, that the substance lost in the mother-liquors of synthetic preparations be recovered as completely as possible.

Until the present time, the natural L-DOPA as well as the L-DOPA obtained through partial synthesis from L-tyrosine were not considered as important from the industrial point of view.

The natural L-DOPA is isolated from Vicia faba by means of a lead complex which is not soluble in water and which, according to R. R. Sealock [Biochem. Pre. 1, 25–28 (1949)], must be decomposed by means of hydrogen sulphide in a very diluted aqueous suspension (300 parts water:1 part of L-DOPA). Subsequently to the filtration of PbS and the concentration to one tenth of the initial volume, the material is crystallized in the presence of sulfur dioxide. However, according to K. Vogler and H. Baumgartner [Helv. Chem. Acta 35, 1776–1780 (1952)], this process is not reliable.

The L-DOPA of partial synthesis is usually obtained in accordance with the following scheme:

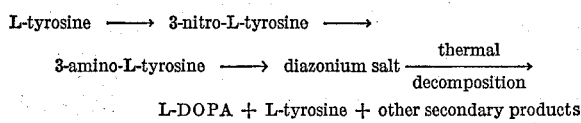

L-tyrosine ⟶ 3-nitro-L-tyrosine ⟶

3-amino-L-tyrosine ⟶ diazonium salt $\xrightarrow{\text{thermal decomposition}}$ L-DOPA + L-tyrosine + other secondary products According to Vogler, this method is not suitable for the preparation of large quantities, i.e., it cannot be applied on the industrial scale, due to the fact that it is difficult to get rid of the secondary products, in particular the tyrosine, and to obtain a pure L-DOPA.

The L-DOPA of partial synthesis may also be obtained through micro-biological hydroxylation of a derivative of L-tyrosine [see for example C. J. Sih and coworkers, J. Amer. Chem. Soc. 91, 6204 (1969)]. The L-DOPA formed must then be isolated from a dilute solution containing impurities, in particular a large amount of tyrosine, which isolation and purification run into the difficulties mentioned above.

The lead complex of DOPA (DOPA.Pb) was described by E. R. Miller [J. Biol. Chem. 44, 481 (1920)], M. Guggenheim [Z. Physiol. Chem. 68, 276 (1913)] and T. Torquati Arch. Farm. Sper. 15, 213, 308 (1913)] and utilized by R. R. Sealock [Biochem. Prep. 1, 25–28 (1949)]. Now, unexpectedly in view of the studies that have already dealt with the material, it has been determined:

(1) That the substance can be obtained not only from the soluble salts of lead but also from insoluble salts of lead, such as chloride or sulphate, (2) That its decomposition does not require the action of $H_2S$ but it can be effected even by a weak acid that does not precipitate lead, e.g., acetic acid.

These two discoveries constitute the basis of the process of the invention which permits the preparation of pure 3,4-dihydroxy phenylalanine (D or L) on the industrial scale with a practically quantitative yield, from an impure material or from a mixture containing the said material.

The process is characterized in that (1) the starting material is treated with an approximately equimolecular quantity of a lead salt in the presence of water, either a lead salt insoluble or slightly soluble in water, or a lead salt soluble in water, (2) the pH of the reactive mixture is brought to and maintained between 5 and 8 by means of a base, (3) the mother liquor is separated and the complex of 3,4-dihydroxy phenylalanine and lead (which is precipitated) is washed, the mother liquor and the washing water being removed, (4) the complex is decomposed by means of an acid in aqueous solution, either (a) a concentrated solution of an acid forming a lead salt which is insoluble or slightly soluble in water, employed in at least stoichiometric quantity in relation to the sum of 3,4-dihydroxy phenylalanine and lead, or (b) a dilute solution of an acid forming a lead salt that is soluble in water, employed in such a quantity and such a concentration that the resulting pH is comprised between 2 and 5, (5) the substance which is precipitated and crystallized is separated and washed, it consists either (a) of a lead salt which is insoluble or slightly soluble while the solution and the washing waters ($EM_1$) contain pure 3,4-dihydroxy phenylalanine in the form of its cation, or (b) pure 3,4-dihydroxy phenylalanine while the solution and the washing waters ($EM_2$) contain a lead salt, (6) pure 3,4-dihydroxy phenylalanine is isolated from the $EM_1$ solution by a concentration to a low volume, then (7a) the pH is adjusted to a value between 3 and 6 by means of a base, which precipitates and crystallizes the substance that is separated from the mother liquor and washed, the mother liquor and the washing waters being then combined ($EM_3$), or (7b) by a treatment with hydrochloric gas, by separating from the mother liquor the chlorhydrate which has crystallized and which is washed, the mother liquor and the washing liquid being then combined ($EM_4$), by dissolving the chlorhydrate in a small amount of water and by continuing the treatment as described in 7a, there is obtained the substance and a mother liquor and a washing water ($EM_5$), and (8) all the residues collected during the preceding operations are recycled, i.e., the insoluble or slightly soluble salt obtained in 5a or the lead salt solution ($EM_2$) obtained in 5b is reemployed in a new stage (1) as a source of reagent and the mother liquors and washing waters obtained in 7a ($EM_3$) or in 7b ($EM_5$), still containing 3,4-dihydroxy phenylalanine, or the mother liquors and the washing waters obtained in 7b ($EM_4$), still containing the corresponding hydrochlorate, are reemployed in a new stage (1) as an additional source of the starting material.

The process may be carried out with advantage under the following conditions:

The crude DOPA in suspension or in aqueous solution which is neutral, slightly acid (acetic acid) or strongly acid (mineral acids), is treated with an approximately equimolecular quantity of a lead salt that is insoluble or slightly soluble in water, e.g., chloride or sulfate, and, in addition, with a base such as ammonia, bicarbonate or carbonate of ammonium, in order to bring to and maintain the pH between 5 and 8, preferably at 7–7.5.

The complex may be formed in the temperature range between the freezing and boiling of the solvent, its precipitation being generally accelerated under heat. The duration of the reaction also depends on the physical condition of the lead salt employed and on the intensity of agitation. In the examples mentioned below, a duration of reaction comprised between 30 minutes and 6 hours is observed.

The complex which is formed is isolated either by filtration or by centrifugation; it is washed repeatedly with water or with an organic solvent miscible with water, under heat or in the cold state, until the impurities disappear completely. The mother liquors and the washing waters are eliminated; they contain only traces of DOPA and lead salt.

The isolated complex which may still be wet is mixed under stirring with a concentrated solution of hydrochloric acid or sulfuric acid, in at least stoichiometric amount in relation to lead and to DOPA. The complex is decomposed immediately, even at a moderate temperature, e.g., ambient temperature. The lead salt precipitates while the DOPA passes into solution.

The lead salt is then separated. It is utilized again, such as it is, as a $Pb^{++}$ source in the following operation. Subsequently, if necessary, the small amount of $Pb^{++}$ which may remain in the solution (e.g., in the case where lead was precipitated in the form of chloride) is removed from the solution in a customary manner, e.g., by the action of hydrogen sulphide.

The process then comprises two variants for the isolation of DOPA:

(a) The solution of DOPA concentrated in advance to a low volume (2–40 parts per part DOPA) is neutralized at moderate temperature, i.e., 0–50° C., to a pH comprised between 2 and 5, preferably to a pH of about 4.5, e.g., by means of ammonia or ammonium bicarbonate; the DOPA is crystallized and isolated. The totality of the mother liquors and washing waters is recycled to a following operation, prior to the precipitation of the complex.

For completing the purification, DOPA is recrystallized in water according to the method described by R. R. Sealock [Biochem. Prep. 1, (1949)], but without a concentration of the mother liquors. After the first jet of DOPA is isolated, the mother liquors are recycled to a following operation, prior to the precipitation of DOPA.Pb complex.

(b) The acid solution (in particular hydrochloric acid solution) is concentrated; the gaseous hydrochloric acid is bubbled in a temperature range comprised between 50° and the freezing temperature of the solvent; the chlorhydrate of DOPA is crystallized and isolated. The totality of the mother liquors and washing waters is recycled to a following operation, prior to the precipitation of the complex.

The hydrochlorate of DOPA thus isolated is dissolved in a minimal amount of water and the solution is neutralized to about a pH of 4.5; the pure DOPA is crystallized and isolated; the mother liquors and washing waters are recycled together with the preceding liquors and waters.

According to another method of realization of the process, the DOPA.Pb complex may also be prepared from a solution or suspension of crude DOPA, under the same conditions as described above, but employing as $Pb^{++}$ source a soluble salt of lead, e.g., the acetate or the nitrate. Generally, the reaction is faster than in the first method of realization; in particular, it is immediate when all the reagents are in solution.

The complex is isolated; it is washed as above and mixed subsequently with a dilute solution of an acid that does not precipitate lead, in such an amount and in such a concentration that the pH remains comprised between 2 and 5, for example with 2 N acetic acid. The mixture is agitated energetically; the DOPA.Pb complex decomposes rapidly at ambient temperature, the DOPA is crystallized and isolated.

The mother liquors and washing waters containing $Pb^{++}$ are employed as a source of this reagent for the preparation of the complex in a following operation; and in such a manner the DOPA contained therein is recycled automatically. The isolated DOPA may be recrystallized in water as described in the first method of realization.

For a certain elimination of traces of lead, isolated DOPA is preferably dissolved in the stoichiometric amount of a strong acid in aqueous solution, $Pb^{++}$ traces are precipitated in the form of PbS which is eliminated and DOPA is crystallized by neutralization, as described above.

Accordingly, the process comprises two principal stages:

(1) Preparation and isolation of the complex from a solution of crude DOPA.

(2) Decomposition of the complex and isolation of the DOPA.

Since the two stages are independent, it is possible to form the complex in an operation by employing an insoluble salt of lead (the first variant) and to decompose it in an acid producing a soluble salt of lead (the second variant) and inversely.

Accordingly, the complex may also be formed by employing at the same time an insoluble salt of lead, e.g., such as obtained during a previous operation, and the introduction of lead is completed by means of a soluble salt and inversely.

Finally, it is clear that the process may be applied both to the purification of the D-DOPA as well as to that of the L-DOPA, since the physical properties of the two substances are identical, if the specific rotatory power is left out of consideration.

The process of the invention exhibits the following advantages in relation to the methods of the prior art:

(1) The reagent ($Pb^{++}$) for the specific precipitation of the DOPA is recycled;

(2) The employment of large amounts of $H_2S$ and, consequently, the accumulation of PbS or its costly transformation into a utilizable reagent are eliminated.

(3) Every mother liquor which still contains DOPA is recycled, without any concentration.

(4) The entire amount of DOPA introduced into the operation is isolated in pure state by crystallization, since there is no accumulation of mother liquors due to the fact that the mother liquors are recycled.

(5) Since the complex is almost entirely insoluble, the losses are minimal and the impurities are readily eliminated.

(6) The effluents contain lead only in the form of traces that can be readily eliminated, ammonia in the form that can be recovered (chloride, sulfate or acetate of ammonium) and the impurities of crude DOPA. Consequently, there is no need for an expensive treatment to avoid the risk of pollution of waters by such effluents.

The following examples serve as an illustration of the process described above and do not restrict the invention.

In the examples, the crude L-DOPA which is employed was prepared from L-tyrosine, according to the method of Waser & Lewandowski [Helv. Chim. Acta 4, 657–666 (1921)]. The crude material contains between 80 and 90% of pure L-DOPA and between 5 and 10% of L-tyrosine.

The quantitative analyses of the DOPA are made in accordance with the colorimetric method of Arnow [J. Biol. Chem. 118, 531 (1937)].

EXAMPLE 1

Eight liters of water, 80 ml. crystallizable acetic acid and 100 g. L-DOPA at 85% (0.445 mole) are introduced into a 10 liter vessel equipped with a stirrer, a reflux refrigerator and a thermometer. The material is heated to 60–65° C. while stirring, so as to obtain a (pale yellow) solution; there remains a small amount of insoluble material. There is added 228 g. (0.06 mole) crystallized lead acetate ($3H_2O$); the mixture becomes slightly cloudy and darker. Then 5 g. of activated carbon is added, the material is cooled to 20–25° C. and filtered on fritted glass. The pale yellow filtrate is poured into a 10-liter vessel and about 238 ml. ammonia at 20% is added slowly, under nitrogen atmosphere, to a pH of 7.2–7.3. At the start, the pH is 4; the DOPA.Pb complex is precipitated progressively as the ammonia is introduced and the reactive mixture thickens at the end. The material is still stirred for 30 minutes and filtered on two large filters of fritted glass having a diameter of 260 mm.; the filtering operation lasts for about 40 minutes. The material is dried as much as possible, each cake is placed into 5 liters water, stirred for 15–30 minutes, filtered again on fritted glass and each cake is washed with 500 ml. water.

The DOPA.Pb complex is introduced in portions into a 4-liter vessel containing 250 ml. water and 190 ml. 10.5 N hydrochloric acid (2 moles), while the stirrer is operated. The complex decomposes rapidly and (white) lead chloride is precipitated. After the introduction is completed, the material is stirred for 30 minutes. The total volume is about 2 liters; the material is then concentrated under vacuum to a volume of 1 liter. Lead chloride is filtered on fritted glass (ready filtration) and the material is washed twice, each time with 50 ml. 0.1 N hydrochloric acid. The pH of the filtrate is brought to 0.8–1.2 by the addition of ammonium bicarbonate and the material is saturated with hydrogen sulphide in order to precipitate the $Pb^{++}$ remaining in the solution; the precipitate is red at the outset ($PbCl_2 \cdot 3PbS$), then black. After one hour, a test sample is filtered and the conclusion of the precipitation is verified. Stirring is performed still for two hours under a low pressure of hydrogen sulphide, then 2 g. of activated carbon are added, which accelerates the subsequent filtration. It is performed on fritted glass through a cellulose filter and the material is washed twice, each time with 30 ml. hot water. The filtrate is heated to 70–80° C. while subjected to stirring and while nitrogen is bubbled in order to remove hydrogen sulphide. Five g. activated carbon is added, the material is filtered while hot and washed again with 3× 30 ml. hot water. The filtrate has a yellow-green tint. The material is poured into a 3-liter vessel and the pH is adjusted to about 4.5 by adding about 75 g. ammonium bicarbonate while the material is subjected to stirring. The start of precipitation of the L-DOPA is observed at a pH of 2.5. There is added 1.5 g. ethylene diamine tetraacetic acid (EDTA); the pH drops to 3.5–4 and the solution is slightly discolored. The material is subjected to stirring for 2 hours at 20° C., under nitrogen, and then filtered on fritted glass. The L-DOPA is washed on the filter with 4× 50 ml. water, in order to eliminate the chlorides, and then with 50 ml. ethanol and the material is dried in a drier at 60° C.

Thus, 71.2 g. ($A_1$) is obtained. According to the colorimetric quantitative analysis of Arnow, the mother liquors still contain 9.60 g. L-DOPA to be recycled. The rate of recovery of L-DOPA:

$$\frac{71.2 \cdot 100}{85 - 9.60} = 94.5\%$$

Recrystallization

In order to recrystallize the product which is obtained, 65 g. DOPA $A_1$ and 2600 ml. (40 volumes) of water are introduced into a 4 liter vessel, equipped with a stirrer and a reflux refrigerator, and the material is brought to boiling. One g. EDTA and 5 g. activated carbon are added, the material is stirred for 5–10 minutes and filtered on fritted glass directly into a 4 liter vessel; the filtrate is colorless. About 30 ml. of an aqueous solution of sulphur dioxide is added and the material is cooled to 20° C. The material is stirred for 5–10 hours and filtered on fritted glass. The L-DOPA is well crystallized and white. The material is washed with 2× 30 ml. water, then with 30 ml. ethanol and dried in a drier at 60° C.

Thus, 50 g. ($A_1^*$) are obtained. The yield of recrystallization is 77%.

| | $A_1$ | $A_1^*$ |
|---|---|---|
| Nitrogen, total (theory 7.11%) | 7.04% | 7.09%. |
| $[\alpha]_D$ (C=2%, in HCl N) | $-10.8° \pm 0.5°$ | $-11.5° \pm 0.5°$. |
| Iron (in mg. per 100 g.) | Less than 1 | Less than 1. |
| Pb (polarography; in mg. per 100 g.) | 1 | 1. |
| Chromatography on paper: | | |
| Tyrosine | Less than 0.2% | Less than 0.1%. |
| Other impurities | One, hardly visible for spot of 100γ, having lower Rf than that of DOPA. | One, hardly visible for spot of 500γ. |

EXAMPLE 2

Fifty g. of crude L-DOPA at 86% (0.218 mole), 500 ml. water and 26.5 ml. hydrochloric acid at 10.5 N (0.275 mole) are introduced into a one liter vessel. The material is heated to 35–40° C. while it is subjected to stirring, in order to facilitate the dissolving and 2.5 g. activated carbon is added. The material is stirred for 10 minutes, filtered, washed with a small amount of water and poured into a six liter, vessel. There are added 3.5-liter water and 76.5 g. of finely comminuted lead chloride (0.275 mole, which is an excess of 25%), recovered from a previous test. The pH of the reactive mixture is about 1.4. The material is heated to 50° C. under nitrogen while subjected to strong stirring, then it is neutralized with concentrated ammonia to the pH 7–7.5; the pH drops slowly. The pH is brought to and maintained at 7–7.5 by small additions of ammonia until it becomes stable. The neutralization requires about 80–90 ml. concentrated ammonia, added during 30–60 minutes. The precipitate which is slightly bluish is filtered on a fritted glass filter having a diameter of 25 cm.; the filtering takes place rapidly. The cake is washed immediately without permitting its drying, by 5× 200 ml. cold water. The total volume of the filtrate and of the combined washing waters is about 4.6 liters; it contains about 0.2 g. of L-DOPA and about 0.1 g. of lead.

The complex DOPA.Pb is placed (again) into 90 ml. hydrochloric acid at 10.7 N (0.96 mole). For the rest, the operational procedure is identical with that described in Example 1, with lead acetate. In brief: the material is concentrated to about 500 ml., lead chloride is filtered, the pH of the filtrate is brought to 0.8–1.2, the material is saturated with hydrogen sulphide and the lead is precipitated in the form of sulphide, PbS is filtered cold, the color is taken out at 70–80° C. by activated carbon, the material is neutralized to pH 4.5 by ammonium bicarbonate and EDTA, filtered and washed. The L-DOPA which is collected is white.

Thus, 35.3 g. ($A_2$) are obtained. According to the quantitative analysis, the yellow-colored mother liquors of $A_2$ contain 5.5 g. of L-DOPA.

First recycling

Water is added to the mother liquors of $A_2$ so that 4 liters of material are obtained, 26 ml. 10.7 N hydrochloric acid and 44.5 g. of L-DOPA at 86% are added thereto and the whole is heated to 40° C. A small amount of insoluble grayish material remains. There is added 2.5 g. activated carbon and the material is filtered. The solution thus obtained has a pale yellow color, the pH is 1.6. There is added 76.5 g. lead chloride and the operation is continued in accordance with the procedure described above.

Thus, 36 g. ($B_2$) of white L-DOPA is obtained. The yellow-colored mother liquors of $B_2$ contain 7.5 g. of L-DOPA.

Second recycling

Water is added to the mother liquors of $B_2$ so that 4 liters of material are obtained, as described above. There is added 26 ml. 10.7 N hydrochloric acid and 42.5 g. of L-DOPA at 86%. After discoloration on activated carbon and addition of 76.5 g. lead chloride, the DOPA-Pb complex is precipitated, which complex is slightly colored (grayish) in this case. The isolated L-DOPA is gray-white Thus, 32.1 g. ($C_2$) is obtained. In the mother liquors of $C_2$, 7.1 g. of L-DOPA remains to be recycled.

In the three operations described above, totally 137 g. of L-DOPA at 86% was employed, which is 117.8 g. at 100%. If the amount remaining in the mother liquors is taken into consideration, 110.5 g. were employed, in fact: accordingly, the rate of recovery is:

$$\frac{(35.3+36+32.1) \cdot 100}{110.5} = 93.4\%.$$

The three portions of L-DOPA obtained are recrystallized in accordance with the method described in Example 1. Thus, from $A_2$, there is obtained $A_2^*$ with a yield of 74.5%,
from $B_2$, there is obtained $B_2^*$ with a yield of 68%,
from $C_2$, there is obtained $C_2^*$ with a yield of 62%.

The L-DOPA remaining in the mother liquors of recrystallization is to be recycled.

EXAMPLE 3

Fifty g. of L-DOPA at 86% containing about 8% of tyrosine are treated in accordance with the method described in Example 2. The produced DOPA-Pb complex is decomposed in 61.2 ml. 10.7 N hydrochloric acid (3 molar equivalents in relation to L-DOPA). The reactive mixture is concentrated to about 200 ml. (pH 0.8–1), lead chloride is filtered and the filtrate is saturated with hydrogen sulphide, as described in Example 1. PbS is filtered and the filtrate is concentrated to about 125 ml., under vacuum. The brown solution thus obtained is cooled to 20° C. and saturated with hydrochloric gas. The crystallization is initiated and it lasts for 4 hours at 20° C. The hydrochlorate of L-DOPA is filtered, the material is washed in acetone and dried in a drier at 50° C., under vacuum.

ANALYSIS

| L-DOPA | Total nitrogen (theory: 7.11%) | $=[\alpha]_D$ (CS2%, in HCl N) with 0.5° (degrees) | Lead (polarography) in mg. per 100 g. | Paper chromatography | |
|---|---|---|---|---|---|
| | | | | Tyrosine, percent | Impurities having lower Rf than DOPA |
| $A_2$ | 7.06 | −11.1 | 5 | <0.1 | 2 impurities visible for a spot of 100γ |
| $A_2^*$ | 7.10 | −11.6 | <0.5 | <0.1 | Do. |
| $B_2$ | 6.99 | −11.3 | 12 | <0.15 | Do. |
| $B_2^*$ | 7.06 | −11.4 | 1 | <0.1 | Do. |
| $C_2$ | 6.92 | −11.2 | 2 | <0.1 | Do. |
| $C_2^*$ | 7.09 | −11.1 | <0.5 | <0.1 | Do. |

Thus, 36.8 g. (72.4% of the theory) is obtained; the substance melts at 208–210° C. [Kofler stand; 209° C. according to the literature—Helv. Chim. Acta 4, 657–666 (1921)].

The acid mother liquors are concentrated under vacuum, in order to recover to a great extent the hydrochloric acid. The mother liquors contain 7.8 g. of L-DOPA and are to be recycled.

Decomposition of L-DOPA hydrochlorate

One part of hydrochlorate is dissolved in 5 parts cold water, treated with hydrogen sulphide as in example 1, whereafter the pH is brought to 4.5–5 through the addition of ammonium bicarbonate. The material is stirred at 20° C. for 2 hours, filtered, washed with water in order to eliminate the chlorides and the L-DOPA is thus isolated with a yield of about 95%.

ANALYSIS

|  | Hydrochlorate of L-DOPA | L-DOPA |
|---|---|---|
| Total nitrogen | 5.92% (theory 6.0%) | 7.07% (theory 7.11%). |
| Ionized chlorine | 15.4% (theory 15.2%) |  |
| $[\alpha]_D$ (C=2%, in HCl N) | $-9.5°$ ($\pm 0.5°$) ($-11.3°$ $\pm 0.5°$) reduced to L-DOPA. | $-11.2°$ ($\pm 0.5°$). |
| Lead (polarography) | 3.5 mg. per 100 g. | 0.5 mg. per 100 g. |
| Paper chromatography: |  |  |
| Percent tyrosine | Less than 0.1 | Less than 0.1. |
| Other impurities | Impurities having Rf two visible faintly | lower than L-DOPA: for a spot of 100γ. |

EXAMPLE 4

A solution is made of 10 g. impure DOPA, analyzed quantitatively at 85% in accordance with the method of Arnow and containing, in particular, 8% tyrosine, in 64 ml. 1 N sulfuric acid; the slightly clouded solution is filtered so as to remove the insoluble impurities and diluted to 800 ml. with water. It is tepified to 50° in a reactor, under nitrogen and under strong stirring. Then 17 g. of finely comminuted lead chloride is added whereafter 14 ml. of a concentrated ammonia solution is added slowly. The addition lasts for 1 hour and 40 minutes. The material is cooled and filtered on fritted glass. The dried cake is placed into 400 ml. water and filtered again; then the material is washed twice on the filter with 50 ml. water and, thereafter, twice with 50 ml. acetone.

After drying, the DOPA cake is thrown in portions into 12.3 ml. 10 N hydrochloric acid to which 2 ml. of a 1% solution of sulfur dioxide has been added. The material is stirred for 10 minutes at ambient temperature, under nitrogen, and lead chloride is filtered. Traces of $Pb^{++}$ are eliminated by means of hydrogen sulphide, in accordance with the method described in Example 1. The filtrate is evaporated to 20 ml., whereafter gaseous hydrochloric acid is passed through the material to saturation, at ambient temperature. At the same time, precipitation is initiated by means of a few crystals of hydrochlorate of DOPA. Then the mixture is left standing for 5 hours at 0°. Subsequently, hydrochlorate of DOPA is filtered, washed with a small amount of acetone and dried under vacuum.

Thus, 6.9 g. hydrochlorate of DOPA is obtained. The filtrate still contains 1.2 g. of L-DOPA (quantitative analysis according to Arnow) to be recycled. Accordingly, the yield is 79.6%.

Analysis

Melting point: 205° (Kofler stand) $[\alpha]_D$ (c.=2%; HCl N): $-9.3° \pm 0.5°$ ($-11.2°$ reduced to L-DOPA)
Nitrogen (theory 6.0%): 5.85%
Ionized chlorine (theory 15.2%): 15.5%
Tyrosine: 0.1%
Lead: 5 mg. per 100 g.

EXAMPLE 5

A solution of 22.7 g. lead acetate in 50 ml. water is treated with 100 ml. 1 N sulfuric acid and filtered. The precipitate is washed with water. An equivalent amount of moist lead sulfate obtained during a previous operation may also be utilized.

On the other hand, a solution of 10 g. of impure L-DOPA in diluted sulfuric acid is prepared as described in Example 4. Wet lead sulfate obtained above is added to this solution in a reactor equipped with a strong stirrer, under nitrogen and at 30° C. Drop by drop, 6 ml. of 11 N ammonia is added so as to obtain a pH of about 5 and the crystallization of the DOPA:Pb complex is initiated by adding to the mixture 5 g. of wet complex obtained elsewhere. The addition of ammonia is continued until a stable pH of 7.3 is reached; 7.5 ml. of 11 N ammonia are required; the addition lasts for 10 hours. The material is filtered on fritted glass; the cake is dried under nitrogen atmosphere, placed into 400 ml. water, filtered again and washed twice with 50 ml. water.

The dried complex is thrown into 17 ml. 6 N sulfuric acid; the material is stirred for 15 minutes under nitrogen and lead sulfate is filtered on paper. This salt is utilized (just as it is) in another operation. For ten minutes, hydrogen sulphide is passed into the filtrate; 0.5 g. animal black is added and the material is filtered. The filtrate is heated to 70° C. with bubbling of nitrogen, 0.5 g. animal black is added and the material is filtered hot.

Subsequently, the cooled solution is neutralized to the pH 5.3 by means of ammonium bicarbonate and the L-DOPA is allowed to crystallize in the cold state, during three hours. The material is filtered, washed with 10 ml. cold water, then with 10 ml. ethanol and dried under vacuum.

Thus, 5.8 g. are obtained. The filtrate and the washing waters still contain 0.9 g. of L-DOPA to be recycled.

Analysis

Nitrogen: 7.02% (theory 7.11%)
$[\alpha]_D = -10.9°$ (c.=2, in HCl 1N)
Tyrosine: less than 0.1%
Lead: 1 mg. per 100 mg.

EXAMPLE 6

Into a six-liter vessel equipped with a stirrer, a thermometer and a reflux refrigerator, there are introduced 4000 ml. water, 40 ml. crystallizable acetic acid and 50 g. crude L-DOPA at 86%. The mixture is brought to 60–65° C. and a (pale yellow) solution is obtained, which solution is slightly cloudy. There is added 114 g. (0.30 mole) crystallized lead acetate (3 $H_2O$). The solution becomes greenish brown. Five g. of activated carbon are added, the material is cooled to 20° C. and filtered on fritted glass. The solution which is obtained is perfectly transparent and possesses a pale yellow color (pH 3.9–4.0). It is poured into a six liter vessel comprising a circulation of nitrogen.

Then, the ammonia concentrated to less than 20% is added drop by drop, rapidly (approximately in 20 minutes), until the pH is stabilized at 7–7.5. The precipitation of the DOPA.Pb complex starts approximately at the pH 5.2. The very fine precipitate possesses a whitish color. The material is stirred for about 30 minutes at 20° C., (always) under nitrogen, and then filtered on a fritted glass filter having a diameter of 30 cm. The cake of the complex is placed into a vessel with 2.5 liters of water and the material is stirred under nitrogen for 30 minutes. It is filtered on the same filter and washed with 250 ml. water. The combined filtrates and washing waters represent a total volume of the order of 6.5 liter. Generally, the loss of L-DOPA is very low (0–0.5 g.). This is true also for the loss of lead (0.1–0.5 g.).

The complex is poured in portions into a 2 liter vessel provided with the circulation of nitrogen. There is added 500 ml. 2 N acetic acid and the material is stirred. The complex passes into a (dark yellow) solution and the L-DOPA crystallizes after 15–30 minutes. In order to improve the crystallization, seeding is preferably applied. The material is stirred for 4 hours at 15–20° C. (pH 3.90), filtered on fritted glass and washed three times with 30 ml. water, then twice with 30 ml. ethanol. White L-DOPA is obtained.

Thus, 29 g. ($A_6$) are obtained. The mother liquors posses a dark yellow color. According to the colorimetric quantitative analysis of Arnow, the said liquors contain 12.4 g. of L-DOPA and, practically, the amount of lead introduced at the outset (polarography).

First recycling

The mother liquors of $A_6$ are poured into a six liter vessel and diluted to 4 liters by means of water. There is added 37.6 g. crude L-DOPA at 86% and the procedure is continued in accordance with method described above. A whitish DOPA.Pb complex is obtained.

After the decomposition in acetic acid, 28 g. ($B_6$) of L-DOPA is obtained. The mother liquors contain 15.6 g. of L-DOPA and, practically, there is no loss of lead.

Second recycling

The mother liquors of $B_6$ are diluted to 4 liters by means of water, in a six liter vessel and 34.4 g. crude L-DOPA at 86% is added. The material is brought to 60–65° C. and 5 g. activated carbon is added. The material is filtered; the solution is pale yellow. The procedure is continued in accordance with the method described above. Also in this case, the DOPA.Pb complex is cream-white.

After the decomposition in acetic acid, 27.5 g. ($C_6$) of the L-DOPA is isolated. The (brown) mother liquors obtained contain 14 g. of L-DOPA and the lead required for another operation.

The isolated L-DOPA contains lead in non-negligible amounts. Moreover, it is slightly colored occasionally. The weight of the crude L-DOPA employed in the three operations amounts to 122 g., which is 105 g. at 100%. The last mother liquors contain 14 g. of L-DOPA that can be recycled; accordingly, 91 g. of L-DOPA at 100% were employed. Therefore, the rate of recovery is:

$$\frac{(29+28+27.5)\ 100}{91} = 93\%$$

Purification

The three batches of L-DOPA obtained ($A_6$, $B_6$ and $C_6$) contain non-negligible amounts of lead that is not eliminated completely by recrystallization in water. In this case, the products are dissolved in hydrochloric acid and the lead is precipitated in the form of PbS by bubbling hydrogen sulphide. For example, 19.7 g. (0.1 mole) of L-DOPA $A_6$ and 100 ml. (0.1 mole) normal hydrochloric acid are introduced into a 250 ml. balloon and stirred while subjected to heating to 60° C. until the dissolving is completed. The solution is cooled to 20° C., saturated with hydrogen sulphide and the L-DOPA is isolated in accordance with the method described in Example 1.

Thus, 15.8 g. of L-DOPA ($A_6$*, yield 80%) are obtained.

EXAMPLE 7

Into a 2 liter vessel, there are introduced 300 ml. water, 8 ml. crystallizable acetic acid and 20 g. of L-DOPA/L-tyrosine (50:50). The mixture is heated to 60–65° C. for 30 minutes and the insoluble substance is filtered at 60° C. Thus, there is recovered 8.2 g. of L-tyrosine which contains 4% of L-DOPA. The filtrate is admixed with 22.8 g. lead acetate and, then, with 0.5 g. activated carbon. The material is filtered at 60° C. and the filtrate is neutralized under nitrogen to the pH of 7.2–7.3 by means of concentrated ammonia.

The DOPA.Pb complex is isolated and treated with hydrochloric acid. Then the solution is treated with hydrogen sulphide, as described in Example 1. Finally, 7.9 g. of L-DOPA is isolated. The yield of isolation is 79%.

Analysis

Nitrogen: 7.05% (theory 7.11%)
$[\alpha]_D$: $-11.2° \pm 0.5$
Tyrosine: about 0.1%

By recrystallization in 40 volumes of water, in accordance with the method described in Example 1, a white L-DOPA is isolated, which L-DOPA contains merely traces of tyrosine that are much lower than 0.1%.

EXAMPLE 8

Into a 2-liter balloon, there are introduced 750 ml. water, 8 ml. crystallizable acetic acid and 20 g. of a 50:50 mixture of D-DOPA and L-tyrosine. The mixture is heated to 60–65° for about 30 minutes and the insoluble substance is filtered at 60° C. Thus, 8.3 g. of L-tyrosine contaminated by 4% of D-DOPA are recovered. The filtrate is provided with 22.4 g. lead acetate and, then, with 0.5 g. activated carbon. The material is filtered at 60° C. and the filtrate is neutralized under a current of nitrogen by adding concentrated ammonia, to a pH of 7.2–7.3. The DOPA.Pb complex is precipitated, it is isolated and washed on the filter.

The complex is treated with hydrochloric acid and the traces of lead contained in the solution are eliminated with hydrogen sulphide, as described in Example 1. Eight g. of D-DOPA is isolated; accordingly, the yield is 80%.

Analysis

Nitrogen: 7.06% (theory 7.11%)
$[\alpha]_D$: $+11.2° \pm 0.5$
Tyrosine: about 0.1%

When the product obtained is recrystallized in 40 parts of water and the procedure as described in Example 1 is followed, there is obtained white D-DOPA having a tyrosine content clearly lower than 0.1%.

What is claimed is:

1. A process for preparing pure 3,4-dihydroxy phenylalanine from an impure substance or from a mixture containing the said substance, characterized in that (1) the starting material is treated with an approximately equimolecular quantity of a lead salt in the presence of water, which lead salt is either a lead salt insoluble or slightly soluble in water, or a lead salt soluble in water, (2) the pH of the reaction mixture is brought to and maintained between 5 and 8 by means of a base, (3) the mother liquor is separated and the complex of

ANALYSIS

| L-DOPA | Total nitrogen (theory: 7.11%) | $[\alpha]_D$ (C=2%, HCl N) degrees | Lead (polarography) | Tyrosine, percent | Impurities having Rf lower than L-DOPA |
|---|---|---|---|---|---|
| $A_6$ | 7.0 | −11 | 55 mg. per 100 g. | 0.1 | 2 visible for a spot of spot of 100γ. |
| $A_6$* | 7.09 | −11.20 | <0.5 mg | <0.1 | Do. |
| $B_6$ | 6.84 | −11.6 | 1,030 mg | (¹) | Do. |
| $B_6$* | 7.10 | −11.5 | 1 mg | (¹) | Do. |
| $C_6$ | 7.04 | −11.1 | 970 mg | 0.1 | Do. |
| $C_6$* | 7.08 | −11.4 | 0.5 mg | 0.1 | Do. |

¹ Not visible.

3,4-dihydroxy phenylalanine and lead, which is precipitated, is washed, the mother liquor and the washing waters being eliminated, (4b) the complex is decomposed by a diluted aqueous solution of an acid forming a lead salt soluble in water, employed in such a quantity and such a concentration that the resulting pH is between 2 and 5, (5b) the substance which precipitates and crystallizes is separated and washed and it consists of pure 3,4-dihydroxy phenylalanine while the soltuion and the washing waters contain a lead salt and (8) are recycled to stage (1) as an additional source of starting materials.

2. A process as in claim 1, characterized in that the lead salt used to form the complex of 3,4-dihydroxy phenylalanine and lead is the chloride or the sulfate, as salts insoluble or slightly soluble in water, or the acetate, as salt soluble in water, and that the acid used to decompose the complex is acetic acid.

3. A process as in claim 1, characterized in that a finely powdered salt of lead is employed, that the reaction mixture is stirred and that the operation is performed under heat.

4. A process as in claim 1, characterized in that the base employed in stage 2 is ammonia, ammonium bicarbonate or ammonium carbonate.

5. A process as in claim 4, characterized in that the pH is of the reaction mixture in stage 2 is adjusted to a value between 7 and 7.5.

6. A process as in claim 1, characterized in that the complex of 3,4-dihydroxy phenylalanine and lead is washed with water or with an organic solvent miscible with water.

7. A process as in claim 1, characterized in that 3,4-dihydroxy phenylalanine obtained in stage 5b is dissolved in hot water in the presence of a small amount of sulfur dioxide, the crystallization is permitted to take place in the cold state and the first portion which has crystallized is isolated, the mother liquor and the washing waters being recycled into a new stage 1.

8. A process as in claim 1, characterized by the further steps of dissolving in a strong acid the 3,4-dihydroxy phenylalanine obtained in stage 5(b) so as to attain a pH comprised between 0.8 and 1.2, treating the solution with hydrogen sulfide and thus separating the residual lead from the solution in the form of sulfide, and precipitating and crystallizing the 3,4-dihydroxy phenylalanine that contains no lead by means of a base.

9. A process for preparing pure 3,4-dihydroxy phenylalanine from an impure substance or from a mixture containing the said substance, characterized in that (1) the starting material is treated with an approximately equimolecular quantity of a lead salt in the presence of water, which lead salt is either a lead salt insoluble or slightly soluble in water, or a lead salt soluble in water, (2) the pH of the reaction mixture is brought to and maintained between 5 and 8 by means of a base, (3) the mother liquor is separated and the complex of 3,4-dihydroxy phenylalanine and lead, which is precipitated, is washed, the mother liquor and the washing waters being eliminated, (4a) the complex is decomposed by a concentrated aqueous solution of an acid forming a lead salt which is insoluble or slightly soluble in water, employed in at least stoichiometric quantity in relation to the sum of 3,4-dihydroxy phenylalanine and lead, (5) the substance which precipitates and crystallizes is separated and washed and it consists of a lead salt which is insoluble or slightly soluble while the solution and the washing waters are combined and contain pure 3,4-dihydroxy phenylalanine in the form of its cation, (6) from the combined solutions of stage 5(a) pure 3,4-dihydroxy phenylalanine is isolated first by a concentration to a low volume, then (7a) the pH is adjusted to a value between 3 and 6 by means of a base, which precipitates and crystallizes the substance that is separated from the mother liquor and washed, the mother liquor and the washing waters being then combined, and (8) all the residues collected during the preceding operations are recycled to stage 1, including the insoluble or slightly soluble lead salt obtained in stage 5(a) and the mother liquor and washing waters obtained in stage 7(a) still containing 3,4-dihydroxy phenylalanine, as additional sources of starting materials.

10. A process as in claim 9, characterized in that the lead salt used to form the complex of 3,4-dihydroxy phenylalanine and lead is the chloride or the sulfate, as salts insoluble or slightly soluble in water, or the acetate, as salt soluble in water, and that the acid used to decompose the complex is hydrochloric acid or sulfuric acid.

11. A process as in claim 9, characterized in that a finely powdered salt of lead is employed, that the reaction mixture is stirred and that the operation is performed under heat.

12. A process as in claim 9, characterized in that the base employed in stages 2 and 7(a) is ammonia, ammonium bicarbonate or ammonium carbonate.

13. A process as in claim 12, characterized in that the pH is of the reaction mixture in stage 2 is adjusted to a value between 7 and 7.5.

14. A process as in claim 9, characterized in that the complex of 3,4-dihydroxy phenylalanine and lead is washed with water or with an organic solvent miscible with water.

15. A process as in claim 9, characterized in that the combined solutions obtained in stage 7a and containing 3,4-dihydroxy phenylalanine in the form of its cation are brought to a pH value between 0.8 and 1.2 by means of a strong acid, the solution is treated with hydrogen sulfide and the residual lead is thus separated from the solution in the form of sulfide.

16. A process as in claim 12, characterized in that the pH in stage 7(a) is adjusted at 4.5 and that the operation is performed at a temperature comprised between 0 and 50° C.

17. A process as in claim 9, characterized in that 3,4-dihydroxy phenylalanine obtained in stage 6 is dissolved in hot water in the presence of a small amount of sulfur dioxide, the crystallization is permitted to take place in the cold state and the first portion which has crystallized is isolated, the mother liquor and the washing waters being recycled into a new stage 1.

18. A process as in claim 9, characterized by the further steps of dissolving in a strong acid the 3,4-dihydroxy phenylalanine obtained in stage 7(a) so as to attain a pH comprised between 0.8 and 1.2, treating the solution with hydrogen sulfide and thus separating the residual lead from the solution in the form of sulfide, and precipitating and crystallizing the 3,4-dihydroxy phenylalanine that contains no lead by means of a base.

19. A process for preparing pure 3,4-dihydroxy phenylalanine from an impure substance or from a mixture containing the said substance, characterized in that (1) the starting material is treated with an approximately equimolecular quantity of a lead salt in the presence of water, which lead salt is either a lead salt insoluble or slightly soluble in water, or a lead salt soluble in water, (2) the pH of the reaction mixture is brought to and maintained between 5 and 8 by means of a base, (3) the mother liquor is separated and the complex of 3,4-dihydroxy phenylalanine and lead, which is precipitated, is washed, the mother liquor and the washing waters being eliminated, (4a) the complex is decomposed by a concentrated aqueous solution of an acid forming a lead salt which is insoluble or slightly soluble in water, employed in at least stoichiometric quantity in relation to the sum of 3,4-dihydroxy phenylalanine and lead, (5) the substance which precipitates and crystallizes is separated and washed and it consists of a lead salt which is insoluble or slightly soluble while the solution and the washing waters are combined and contain pure 3,4-dihydroxy phenylalanine in the form of its cation, (6) the combined solutions of stage 5(a) are concentrated to a low volume and 7(b) treated with hydrochloric acid gas, the 3,4-dihydroxy phenylalanine hydrochloride which has crystallized is separated from the mother liquor and washed, the mother liquor and the washing waters being then combined and the hydrochloride being dissolved in a small volume of water, the pH of the solution of the hydrochloride is adjusted to a value between 3 and 6 by means of a base, the thus precipitated and crystallized pure 3,4-dihydroxy phenylalanine is separated from the mother liquor and washed, the mother liquor and the washing waters being then combined, and (8) all the residues collected during the preceding operations are recycled to stage 1, including the insoluble or slightly soluble lead salt obtained in stage 5(a) and the mother liquors and washing waters obtained in stage 7(b), still containing 3,4-dihydroxy phenylalanine, or its hydrochloride respectively, as additional sources of starting materials.

20. A process as in claim 19, characterized in that the lead salt used to form the complex of 3,4-dihydroxy phenylalanine and lead is the chloride or the sulfate, as salts insoluble or slightly soluble in water, or the acetate, as salt soluble in water, and that the acid used to decompose the complex is hydrochloric acid or sulfuric acid.

21. A process as in claim 19, characterized in that a finely powdered salt of lead is employed, that the reaction mixture is stirred and that the operation is performed under heat.

22. A process as in claim 19, characterized in that the base employed in stage 2 and in the final precipitation of 3,4-dihydroxy phenylalanine is ammonia, ammonium bicarbonate or ammonium carbonate.

23. A process as in claim 22, characterized in that the pH of the reaction mixture in stage 2 is adjusted to a value between 7 and 7.5.

24. A process as in claim 19, characterized in that the complex of 3,4-dihydroxy phenylalanine and lead is washed with water or with an organic solvent miscible with water.

25. A process as in claim 19, characterized in that the combined solutions obtained in stage 5 and containing 3,4-dihydroxy phenylalanine in the form of its cation are brought to a pH value between 0.8 and 1.2 by means of a strong acid, the solution is treated with hydrogen sulfide and the residual lead is thus separated from the solution in the form of sulfide.

26. A process as in claim 19, characterized in that the pure 3,4-dihydroxy phenylalanine obtained in the last step of stage 7(b) is dissolved in a strong acid, the solution is treated with hydrogen sulfide, the residual lead being thus separated from the solution in form of sulfide, and the 3,4-dihydroxy phenylalanine that contains no lead is precipitated and crystallized by means of a base.

27. A process as in claim 22, characterized in that the pH in the final precipitation of 3,4-dihydroxy phenylalanine is adjusted at 4.5 and that the operation is performed at a temperature comprised between 0 and 50° C.

28. A process as in claim 19, characterized in that 3,4-dihydroxy phenylalanine obtained in stage 7b is dissolved in hot water in the presence of a small amount of sulfur dioxide, the crystallization is permitted to take place in the cold state and the first portion which has crystallized is isolated, the mother liquor and the washing waters being recycled into a new stage 1.

29. A process as in claim 19, characterized by the further steps of dissolving in a strong acid the hydrochloride of 3,4-dihydroxy phenylalanine obtained in stage 7(b) so as to attain a pH comprised between 0.8 and 1.2, treating the solution with hydrogen sulfide and thus separating the residual lead from the solution in the form of sulfide, and adjusting the pH of the solution to a value between 3 and 6 by means of a base, thus precipitating and crystallizing pure 3,4-dihydroxy phenylalanine.

References Cited

Sealock, Biochem. Prep., vol. 1, pp. 25–28 (1949).
E. R. Miller, J. Biol. Chem., vol. 44, p. 481 (1920).

LORRAINE A. WEINBERGER, Primary Examiner

P. J. HAGAN, Assistant Examiner